J. BERGSENG.
REMOVABLE SIDE ATTACHMENT FOR WHEELBARROWS.
APPLICATION FILED JULY 19, 1921.
1,436,567.
Patented Nov. 21, 1922.
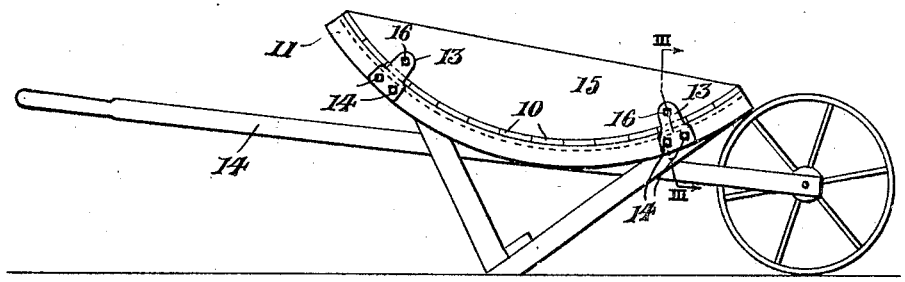
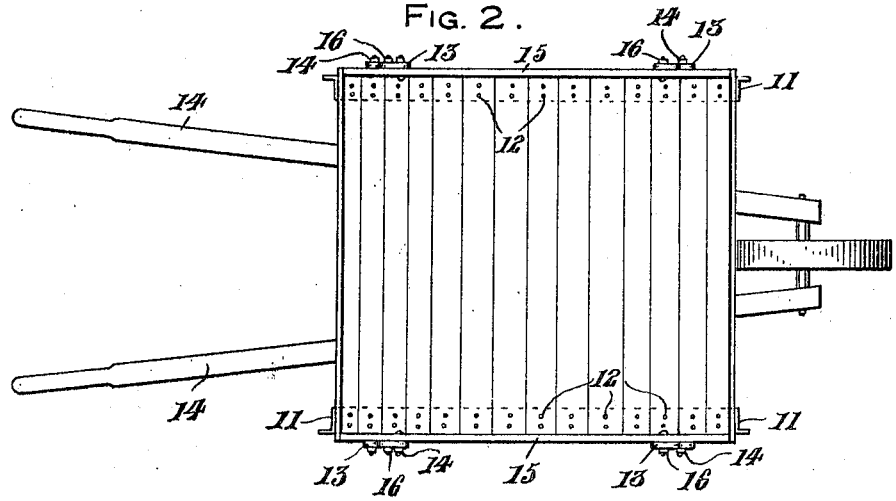
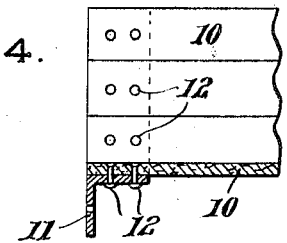
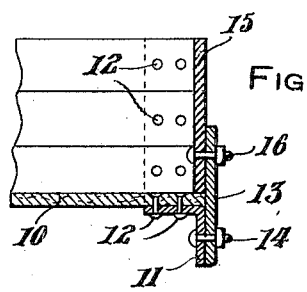
Inventor
John Bergseng
By Herman Johansson
Attorney Patented Nov. 21, 1922.

1,436,567

UNITED STATES PATENT OFFICE.

JOHN BERGSENG, OF WEST SALEM, WISCONSIN.

REMOVABLE SIDE ATTACHMENT FOR WHEELBARROWS.

Application filed July 19, 1921. Serial No. 485,879.

*To all whom it may concern:*

Be it known that I, JOHN BERGSENG, a citizen of the United States, residing at West Salem, in the county of La Crosse and State of Wisconsin, have invented certain new and useful Improvements in Removable Side Attachments for Wheelbarrows, of which the following is a specification.

The present invention relates to a removable side attachment for wheel barrows and its object is to convert an open wheel barrow such as is generally used for carting rocks or stones, into one with sides so that it will be possible to cart grounded material therein, as for instance loose sand, gravel or grain, etc. Wheel barrows of that kind generally have a concave bottom that means that it is curved in the longitudinal direction, but the invention is equally applicable to flat bottomed wheel barrows having a perpendicular front board. The shape of the side boards will naturally have to be modified accordingly.

In the accompanying drawing one embodiment of my invention has been illustrated as applied to a wheel barrow with a curved bottom, and Figure 1 shows a side elevation of the wheel barrow with my side boards attached, Figure 2 is a top plan view of Fig. 1, Figure 3 is a part sectional view along line III—III of Fig. 1 in larger scale, and Figure 4 is a similar sectional view with the side boards unattached.

As will be seen from Fig. 1 the bottom 10 of the wheel barrow is made up in the usual manner of a number of straight boards running transversely of the wheel barrow, but following a curved line in the longitudinal direction thereof, so that the front and rear ends of the bottom are higher than its middle.

Along each side edge of the bottom and underneath the latter I now secure a brace preferably in the shape of an angle iron 11 by means of rivets 12 or in any other suitable manner, so that the perpendicular shank lies flush with the edge of the bottom. To these braces or angle irons I attach a pair of ears 13 by means of bolts 14 and these ears now support the side boards 15, which are preferably made of galvanized iron and held in place by means of bolts 16. The lower edge of the side boards 15 conform to the shape of the bottom and rests thereon. In this case it is curved, but for a flat bottomed wheel barrow it would be straight.

What is claimed as new is:—

1. In a wheel barrow, a wheel supported frame structure, a bottom supported on the frame structure and including longitudinally curved angle irons having side sections arranged in horizontal alinement with the other side sections disposed perpendicularly and outwardly of the horizontal sections, floor boards secured to the horizontal sections, removable side boards supported adjacent the ends of the floor boards, and means cooperatively carried by the side boards and perpendicular sections of the angle irons for retaining the side boards in position.

2. In a wheel barrow, a wheel supported frame structure, a bottom supported on the frame structure and including longitudinally curved angle irons having side sections arranged in horizontal alinement with the other side sections disposed perpendicularly and outwardly of the horizontal sections, floor boards secured to the horizontal sections, removable side boards supported adjacent the ends of the floor boards, and clips anchored to the outer faces of the side boards and the perpendicular sections of the angle irons for retaining the side boards in position.

In testimony whereof I affix my signature in presence of two witnesses.

JOHN BERGSENG.

Witnesses:
BENJAMIN L. LARSEN,
GROVER FIELD.